Jan. 20, 1942.  C. L. HIBERT  2,270,835
CLEANING TOOL FOR SPOT-WELDING ELECTRODES
Filed Oct. 15, 1940
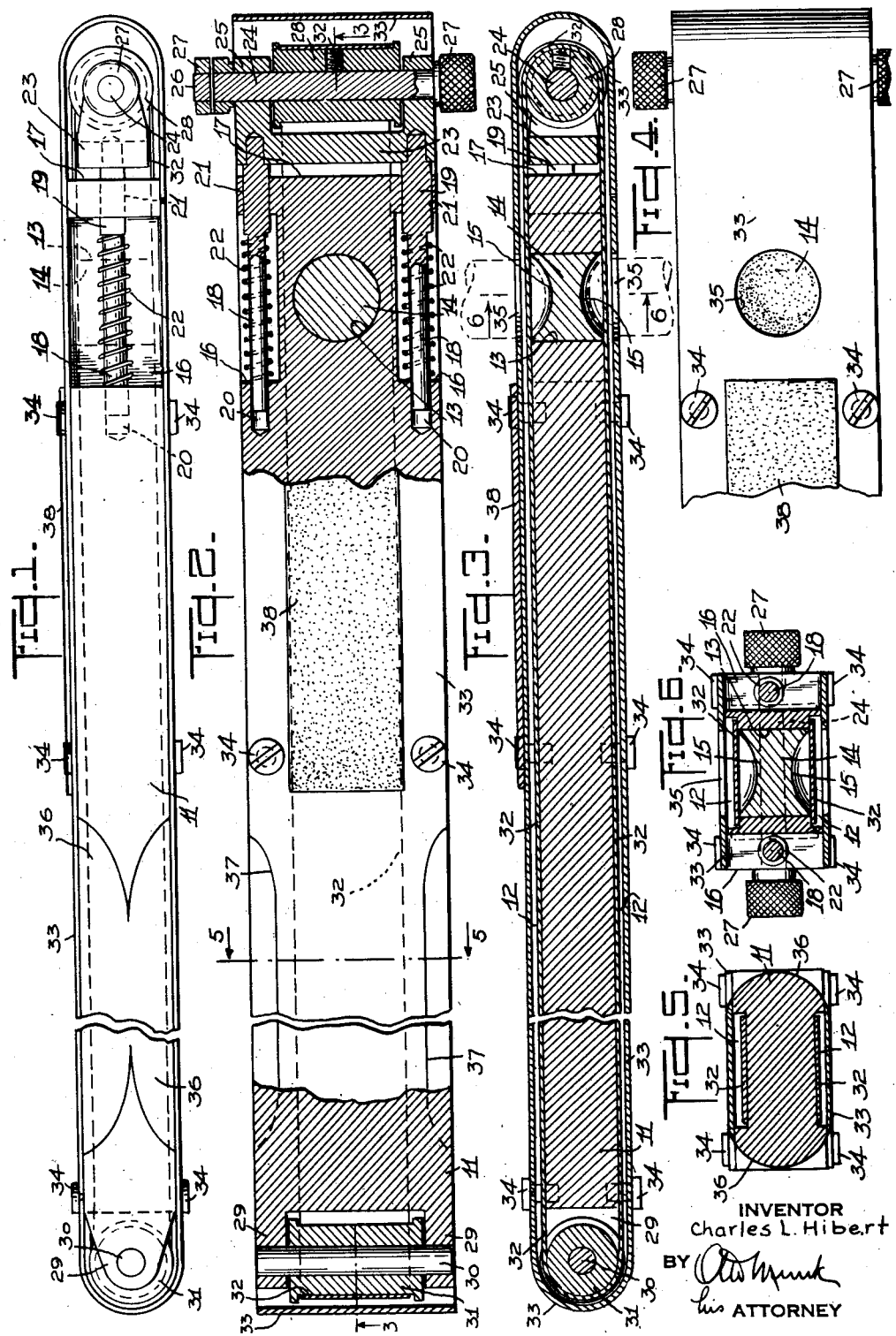
INVENTOR
Charles L. Hibert
BY
his ATTORNEY Patented Jan. 20, 1942

2,270,835

UNITED STATES PATENT OFFICE 2,270,835

CLEANING TOOL FOR SPOT-WELDING ELECTRODES

Charles L. Hibert, La Jolla, Calif., assignor to Sciaky Corporation, Chicago, Ill., a corporation of France Application October 15, 1940, Serial No. 361,199

15 Claims. (Cl. 51—186)

My invention relates to a cleaning tool for spot welding electrodes.

One object of my invention is to provide an electrode cleaning tool which can be applied without any danger of the electrode tip being deformed.

Another object of the invention is to produce a tool which will effect a complete cleaning of the electrode tip without excessive abrasion of electrode material.

A further object of my invention is to provide an electrode cleaning tool in which different surface portions of a sanding element can be successively utilized in a very simple manner.

A still further object of my invention is to produce an electrode cleaning tool in which the entire sanding element can be exchanged easily and rapidly without removal of the element determining the shape to be given to the electrode tip.

Still another object is to provide a tool of the type described that can be easily adapted to the specific desired shapes of the electrode tips to be cleaned.

Other objects are the creation of a tool capable of effecting an accurate and quick cleaning of single electrodes as well as of electrode pairs, and the production of a tool which can be operated by hand without specific skill or experience.

According to the invention, I accomplish the above mentioned and other objects, which will become apparent as the specification proceeds, by the arrangement and combination of parts set forth in the following detailed description, defined in the appended claims and illustratively exemplified in the accompanying drawing, in which:

Fig. 1 is a side elevation of a tool according to the invention;

Fig. 2 is a top view of the same tool, partly broken away and shown in horizontal section;

Fig. 3 is a section taken on line 3—3 of Fig. 2;

Fig. 4 is a top view of the right hand end of the tool;

Fig. 5 is a vertical section taken on line 5—5 of Fig. 2, and

Fig. 6 is a vertical section taken on line 6—6 of Fig. 3.

In the drawing, 11 is an elongated member of wood, metal or the like, having a substantially rectangular cross-section and longitudinal channels 12 provided in its upper and lower surfaces (see Fig. 5).

A cylindrical perforation 13 is provided in the elongated member 11 adjacent one end thereof. A plug 14, consisting of composition material of considerable hardness, is inserted into said perforation 13 with its end faces 15 defining two diametrically opposed depressions of circular outline in the bottom faces of the channels 12, said depressions being shaped in accordance with the shape of the electrode tips to be cleaned.

Recesses 16 are provided in the side faces of the elongated member 11 on opposite sides of the perforation 13, said recesses terminating short of the end face 17 of member 11, and bolts 18 including shoulder portions 19 are slidably inserted in aligned bores 20, 21 to extend parallel to the longitudinal axis of the elongated member 11 through the recesses 16 and to project from the end face 17. Coil springs 22 surround the bolts 18 between one end wall of each recess 16 and the shoulder portion 19 of the corresponding bolt 18 to urge said bolts in an outward direction. A stirrup element 23 is rigidly mounted on the projecting ends of the bolts 18 and a shaft 24 is rotatably supported at right angles to the longitudinal axis of member 11 in aligned bores provided in the ears 25 of the stirrup element 23. The ends 26 of the shaft 24 project laterally from the ears 25 of the stirrup element 23 and carry keyed thereto knurled rollers 27. A channelled roller 28 is keyed to the middle portion of shaft 24 between the ears 25 of the stirrup 23.

The opposite end of the elongated member 11 is provided with two projecting ears 29 carrying between them a transverse shaft 30. A channelled roller 31, similar to roller 28, is loosely mounted on shaft 30 between the ears 29.

An endless belt 32 of pliable material having an outer sanding surface, e. g. emery cloth, passes around the rollers 28 and 31 and along the channels 12 so as to overlie the depressions 15. The belt 32 is held permanently under tension by the springs 22 urging the stirrup 23 and roller 28 away from roller 31.

A band metal cover 33 is bent around the elongated member 11 and rollers 28 and 31 and is secured to the member 11 on opposite sides of the channel 12 by means of screws 34. The cover 33 closes the channels 12, and it surrounds the roller 28 at a sufficient distance from the end face 17 of member 11 to permit free movement of the stirrup element 23 and roller 28 away from said face. Two diametrically opposed holes 35 are provided in the cover 33 in alignment with the depressions 15 to guide the electrode tips to be cleaned into said depressions.

Adjacent the end of member 11 carrying the loose roller 31, the rectangular cross-section of the elongated member 11 is rounded off at 36 and the cover 33 is cut away at 37 to provide a grip.

An additional grinding element 38, e. g. a file or a piece of emery cloth, is secured to the outside of cover 33.

The described tool operates as follows:

The tips 39 of an electrode pair are introduced into the diametrically opposed holes 35 of the cover 33 (see Fig. 3) and pressed towards one another until the portions of the sanding belt 32 overlying the depressions 15 are deformed against the action of springs 22 to the shape of the end faces of plug 14, and the electrode tips enter the depressions. Then, the tool is gripped at its grip 36, 37 and turned back and forth in its own plane about the axis of the electrode pair to effect the cleaning of the electrode tips 39.

When the portions of the sanding belt 32 overlying the depressions 15 are worn out, new belt portions may be brought into operative position simply by turning the knurled rollers 37, thus advancing the belt 32 to a new position. It will be understood that the belt is advanced only between cleaning operations and remains stationary in the tool for the duration of each cleaning operation.

When a belt 32 is worn out completely, it may be removed and replaced easily after unscrewing the cover 33.

The plug 14 may be exchanged if electrodes of a different tip shape are to be cleaned.

Having now described my invention in all details, I claim:

1. A cleaning tool for spotwelding electrodes, comprising an elongated member provided with a deformation of substantially circular outline, said deformation having its axis disposed at an angle to the longitudinal axis of said member, the surface of said deformation consisting of hard material and being shaped in accordance with the shape of an electrode tip to be cleaned, a web of pliable material overlying said deformation, said web having an outwardly facing sanding surface, and means on said member to guide the tip of an electrode against the surface of said deformation.

2. A cleaning tool for spot welding electrodes, comprising an elongated member provided with a depression of circular outline at right angles to the longitudinal axis of said member, the bottom of said depression consisting of hard material and being shaped in accordance with the shape of an electrode tip to be cleaned, a web of pliable material overlying said depression, said web having an outwardly facing sanding surface, and means on said member to guide the tip of an electrode into said depression.

3. A cleaning tool, as claimed in claim 2, in which said depression is provided in said elongated member adjacent one end thereof.

4. A cleaning tool, as claimed in claim 2, in which said web of pliable material is stretched resiliently over said depression.

5. A cleaning tool, as claimed in claim 2, in which said guide means includes a cover for said elongated member, said cover being provided with a hole in register with said depression.

6. A cleaning tool for spot welding electrodes, comprising an elongated member provided with a depression of circular outline at right angles to the longitudinal axis of said member, the bottom of said depression consisting of hard material and being shaped in accordance with the shape of an electrode tip to be cleaned, an endless belt of pliable material passing lengthwise around said elongated member, said belt having an outwardly facing sanding surface, means to advance said belt over said elongated member to bring successively different belt portions into a position overlying said depression, and means on said member to guide the tip of an electrode into said depression.

7. A cleaning tool for spot welding electrodes, comprising an elongated member provided with a recess at right angles to its longitudinal axis, a plug of hard material removably inserted in said recess, the outer face of said plug defining a depression in said member, said depression being shaped in accordance with the shape of an electrode tip to be cleaned, a web of pliable material overlying said depression, said web having an outwardly facing sanding surface, and means on said member to guide the tip of an electrode into said depression.

8. A cleaning tool for spot welding electrodes, comprising an elongated member provided with two diametrically opposed depressions at right angles to the longitudinal axis of said member, the bottom of each depression consisting of hard material and being shaped in accordance with the shape of an electrode tip to be cleaned, a web of pliable material overlying each depression, said web having an outwardly facing sanding surface, and means on said member to guide the tips of an electrode pair to be cleaned into said two depressions, respectively.

9. A cleaning tool for spot welding electrodes, comprising an elongated member provided with a perforation at right angles to its longitudinal axis, a plug of hard material removably inserted in said perforation, the two end faces of said plug defining in said member two diametrically opposed depressions, each shaped in accordance with the shape of an electrode tip to be cleaned, a web of pliable material overlying each depression, said web having an outwardly facing sanding surface, and means on said member to guide the tips of an electrode pair to be cleaned into said two depressions, respectively.

10. A cleaning tool for spot welding electrodes, comprising an elongated member having a substantially rectangular cross-section and being provided with longitudinally extending open channels in two diametrically opposed surfaces thereof, two rollers mounted parallel to said channelled surfaces and transversely of the longitudinal axis of said member at opposite ends of the latter, respectively, a depression in the bottom of one of said channels, said depression being shaped in accordance with the shape of an electrode tip to be cleaned, an endless belt of emery cloth passing in said channels and over said rollers, hand-operated means for turning one of said rollers, and a band metal cover bent around said elongated member and rollers and closing said open channels, said cover being provided with a hole in register with said depression.

11. A cleaning tool, as claimed in claim 10, in which said elongated member is provided with a second depression diametrically opposite said first depression to receive the second tip of an electrode pair to be cleaned, and said cover is provided with a second hole in register with said second depression.

12. A cleaning tool, as claimed in claim 10, including resilient means urging said two rollers apart.

13. A cleaning tool, as claimed in claim 10, including a support for one of said rollers mounted longitudinally slidably on said member, and resilient means to urge said support outwardly.

14. A cleaning tool, as claimed in claim 10, in which said depression is provided adjacent one end of said member, the rectangular cross-section of said member adjacent the other end thereof being rounded off to provide a grip.

15. A cleaning tool, as claimed in claim 10, in which said depression is provided adjacent one end of said elongated member, said tool including two spring pressed bolts disposed slidably in bores of said member parallel to the longitudinal axis thereof and on opposite sides of said depression, the ends of said bolts projecting from said adjacent end of said member, and a stirrup element mounted on the projecting ends of said bolts and carrying between its ears one of said rollers.

CHARLES L. HIBERT.